Patented May 30, 1933

1,911,667

UNITED STATES PATENT OFFICE

NICHOLAS BENNETT, OF APPLETON, HERBERT DODD, OF GLAZEBROOK, MANCHESTER, WILLIAM COLIN SPRENT, OF CRESSINGTON, AND FRED HOLT, OF WEYBRIDGE, ENGLAND, ASSIGNORS TO IMPERIAL CHEMICAL INDUSTRIES LIMITED, A CORPORATION OF GREAT BRITAIN

MANUFACTURE OF BENZYL CHLORIDE

No Drawing. Application filed May 31, 1930, Serial No. 458,914, and in Great Britain June 1, 1929.

This invention relates to the production of benzyl chloride. More particularly this invention relates to the recovery of benzyl chloride from solutions resulting from the benzylation of cellulose.

In another application of even date Ser. No. 458,913 we describe the production of benzyl chloride from a mixture of benzyl alcohol and other products (e. g. the mixture resulting from the benzylation of cellulose) by treatment with hydrochloric acid.

We have now found that such mixtures contain condensation products of benzyl chloride or benzyl alcohol of undefined constitution and therefore the yield of benzyl chloride does not correspond with the total quantity of benzyl compounds present. We have further found, however, that it is possible to split up these compounds by treatment with chlorine, to produce benzyl chloride and benzaldehyde and some benzoyl chloride and nuclear chlorinated derivatives. According to our invention therefore we use chlorine and in this way a considerable quantity of benzyl chloride can be recovered from the mixture to be treated, which would otherwise be lost.

The action of chlorine on the mixture evolves hydrochloric acid at the same time as it splits the condensation products into benzyl chloride and benzaldehyde so that benzyl chloride is simultaneously formed by the reaction of benzyl alcohol and hydrochloric acid as described in our co-pending application.

We prefer however to treat the crude mixture as described in our co-pending specification with hydrochloric acid and recover as much benzyl chloride as possible by this means. Then we take the residue obtained after distilling off the benzyl chloride and treat this with chlorine.

In this way the residue is converted to a mixture consisting substantially of benzyl chloride and benzaldehyde.

Having obtained a product, by either of the two methods described above, consisting of benzyl chloride and benzaldehyde these can be separated by any known method such as fractional distillation, or by extracting the benzaldehyde with sodium bisulfite solution and fractionating the benzyl chloride remaining from the accompanying benzoyl chloride nuclear chlorinated derivatives.

By this means we have obtained yields of benzyl chloride from the original mixture which are increased by about 35% and in addition valuable by-products are obtained such as benzaldehyde and benzoyl chloride.

The benzoyl chloride can also be avoided by adjusting the amount of chlorine so that it does not exceed that required to split the condensation product into benzaldehyde and benzyl chloride without further chlorination.

Example I

The crude benzyl cellulose liquors containing benzyl alcohol are treated by mixing with 10 per cent by weight of calcined sodium carbonate and filtered.

200 parts of the treated benzyl cellulose liquor are mixed together with 300 parts hydrochloric acid specific gravity 1.14 and heated to 80–90° C. with constant agitation for 6 hours. The aqueous portion is then separated from the crude benzyl chloride layer. The crude benzyl chloride is then filtered through soda ash and distilled. 120 parts of benzyl chloride is recovered, 1.11 specific gravity containing 90% pure benzyl chloride.

The still residues (sp. g. 1.06) from the above process are treated with chlorine at ordinary temperature in the ratio of about 160 parts of residues to 40 parts of chlorine. After chlorination the residues (sp. g. 1.095) are distilled and 124 parts of product (sp. g. 1.085) are obtained. These products contain approximately 50% pure benzyl chloride. The benzaldehyde which forms the major part of the residue is recovered by extraction with sodium bisulfite and the residual oil is re-distilled for benzyl chloride.

The benzyl cellulose liquor referred to in the above example is obtainable when alkali cellulose is treated in the presence of water with benzyl chloride. Some of the latter reacts to form benzyl cellulose, some is hydrolyzed to form benzyl alcohol, and some reacts with this latter to form benzyl ether. The mixture is then a mixture of benzyl alcohol, benzyl chloride, benzyl ether, benzyl cellulose, sodium chloride, sodium hydroxide and water. This is extracted with a solvent which is a non-solvent for benzyl cellulose and the sodium salts, e. g., ethyl alcohol, and the benzyl compounds are thus removed. The alcohol is distilled off and the crude benzylation mixture results. It contains perhaps 10-30% of benzyl ether, 20-80% of benzyl alcohol, 5-10% of benzyl chloride, less than 5% of condensation product, less than 5% water, and perhaps some iron.

An advantage of this invention is the recovery of more nearly quantative amounts of benzyl chloride than was heretofore possible.

As many apparently widely different embodiments of this invention may be made without departing from the spirit and scope thereof, it is to be understood that we do not limit ourselves to the specific embodiments thereof except as defined in the appended claims.

We claim:

1. The method of reducing condensed benzyl compounds, resulting from the benzylation of cellulose, comprising treating them with chlorine.

2. In the recovery of benzyl chloride from solutions containing benzyl alcohol from the benzylation of cellulose the step which comprises treating the solution with chlorine.

3. The preparation of benzyl chloride from liquors resulting from the benzylation of cellulose and containing benzyl compounds in solution comprising treating with an anhydrous inorganic alkaline substance, separating the liquors from the alkaline substance thereafter treating with hydrochloric acid, removing the benzyl chloride and thereafter treating the residual liquor with chlorine.

4. The method of preparing benzyl chloride comprising treating a liquor resulting from the benzylation of cellulose and containing benzyl compounds with sodium carbonate, separating the liquor from the sodium carbonate thereafter treating with hydrochloric acid and removing the benzyl chloride, treating the residual liquor with chlorine in such amount as to inhibit the formation of benzoyl chloride and removing the benzyl chloride.

5. The method of preparing benzyl chloride comprising treating a liquor resulting from the benzylation of cellulose and containing benzyl compounds among which is benzyl alcohol, with sodium carbonate, thereafter treating the liquor with hydrochloric acid, separating the benzyl chloride from the liquor, and treating the liquor with chlorine in the ratio of about 160 parts of liquor to 40 parts of chlorine, extracting with sodium bisulfite, and distilling the residual oil for benzyl chloride.

In testimony whereof we affix our signatures.

NICHOLAS BENNETT.
HERBERT DODD.
WILLIAM COLIN SPRENT.
FRED HOLT.